Sept. 29, 1959 — F. W. GREER — 2,906,395
BELT CONVEYOR
Filed July 2, 1957 — 2 Sheets-Sheet 1
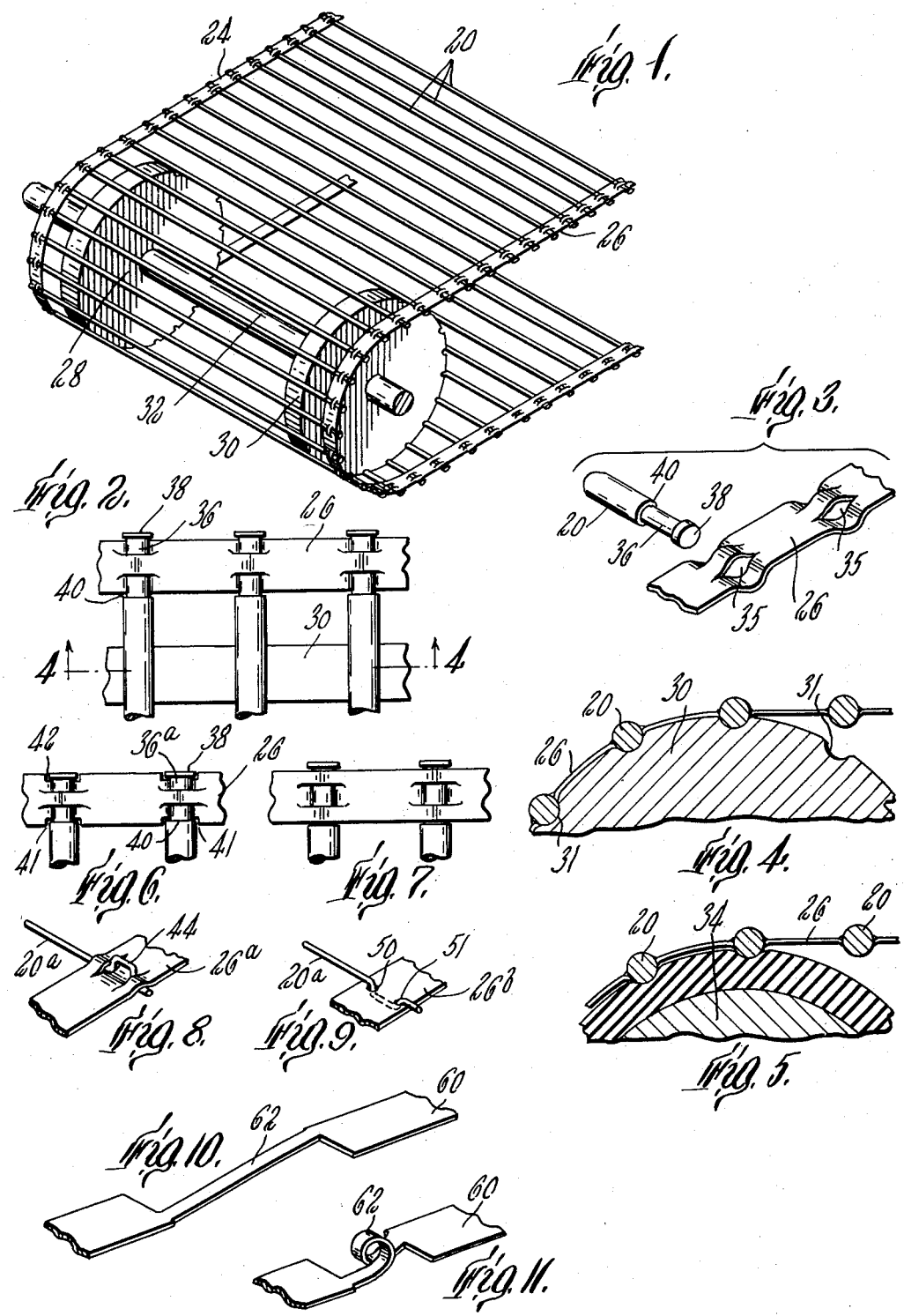

Sept. 29, 1959  F. W. GREER  2,906,395
BELT CONVEYOR

Filed July 2, 1957  2 Sheets-Sheet 2

United States Patent Office 2,906,395
Patented Sept. 29, 1959

2,906,395

BELT CONVEYOR

Fred W. Greer, Lincoln, Mass., assignor to Wire Belt Company of America, Winchester, Mass., a corporation of Massachusetts Application July 2, 1957, Serial No. 669,499

3 Claims. (Cl. 198—195)

This invention relates to conveyor belts and more particularly to endless wire belts of the type commonly used, for example, in the food industry.

More sanitary design and construction of food processing equipment and conveyor belts, making cleaning easier and more thorough, is being insisted upon by most cities and doubtless soon will be throughout the country.

It is a primary object of the invention to simplify the construction of such belt with a particular eye to ease of cleaning, of assembly, and of repair, and also reduce the cost of the belt.

While it has heretofore been suggested that such belts be in the form of a series of spaced parallel wire rods or wires which are mounted over and driven by spaced grooved discs, the edge assembly construction has been complicated by the necessity of providing flexibility in order to permit the conveyor to pass through the radius at the ends of the orbital path of the endless belt. This has heretofore been accomplished in a variety of ways by bending the ends of each wire and hooking them loosely over the preceding wire or in other cases by articulating the series of cross wires with hinges or links interconnecting each wire to each of its adjacent wires in the form of a sprocket chain or otherwise.

In accordance with this invention, spacing and connecting means for the parallel wires are continuous longitudinally extending elongated elements holding more than two and preferably all of the wire ends so that the conveyor may be looped and fastened in endless form merely by joining at each side of the belt abutting ends of the continuous elements.

Such continuous elements as are used in accordance with this invention have longitudinal flexibility but can be either strip material or strand material preferably of metal. An important feature of the invention is that the means cooperating to hold the cross rods or wires in assembled and spaced relation are entirely integral with the continuous elements and rods so, in effect, the conveyor is, or may be, a simple three-element structure constituted of:

(1) a group of properly formed cross wires;
(2) a properly formed continuous longitudinally extending element at one end of the wires for holding them in spaced parallel series relationship; and
(3) a similar longitudinally extending, parallelly disposed continuous element for similarly holding and spacing the other ends of the series of wires.

While certain embodiments of the invention may vary from others, all have the common feature of particular ease of cleaning and assembly arising from the fundamentally tri-part structure. Certain of such variations are disclosed in the accompanying drawings wherein:

Fig. 1 is a fragmentary isometric view of a belt of this invention indicating its manner of mounting about a driving shaft;

Fig. 2 is an enlarged detail of certain of the parts shown in Fig. 1;

Fig. 3 is an exploded view of certain of the parts shown in Fig. 2;

Fig. 4 is a fragmentary cross-sectional view taken along the line 4—4 of Fig. 2;

Fig. 5 is a view similar to Fig. 4 showing a modification of the structure of the driving wheel;

Fig. 6 is a detail of a modified form of the invention;

Fig. 7 is a detail of certain of the parts shown in Fig. 2 as viewed from the opposite side;

Figs. 8 and 9 are details showing two further modifications;

Figs. 10 and 11 show a still further modified form of continuous element;

Figure 12:
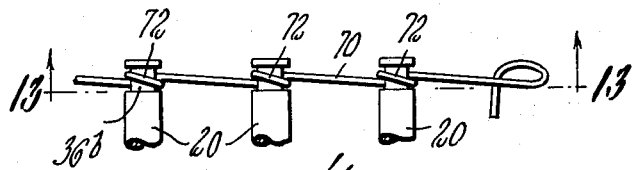
Fig. 12 shows a further modification in the form of the continuous longitudinally extending element.
Figure 13:
Fig. 13 is a cross-sectional view taken along the line 13—13 of Fig. 12.
Figure 14:
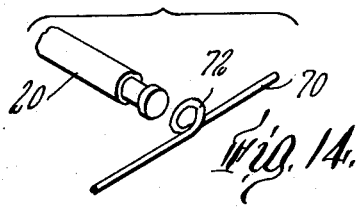
Fig. 14 is an exploded detail view of the modification shown in Figs. 12 and 13.
Figure 15:
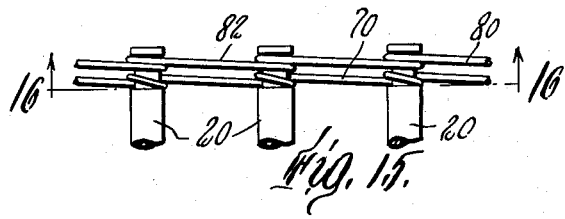
Figure 17:
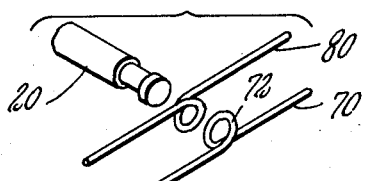
Figure 16:
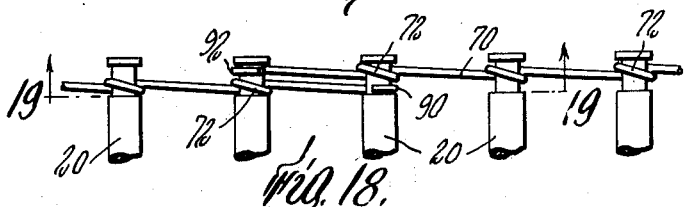
Figure 18:
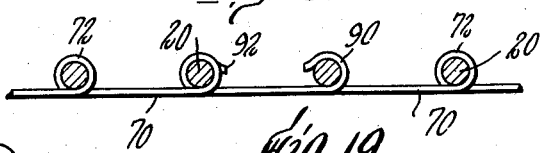
Figure 19:
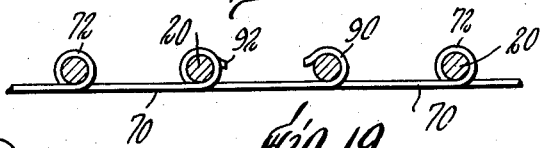
Figure 20:
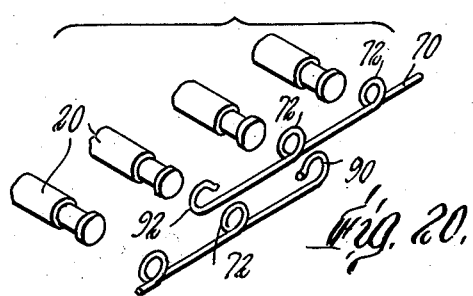

Figs. 15, 16 and 17 are views, similar to those of Figs. 12, 13 and 14, respectively, of a still further modification; and Figs. 18, 19 and 20 are views, similar to those of Figs. 12, 13 and 14, respectively, showing a method for connecting the ends of the continuous belt of Fig. 12.

Referring now to Fig. 1, there is shown a series of cross rods or wires 20 which are held in spaced series relationship, forming a belt, by a longitudinally extending continuous element 24 at one end of the wires 20 and by a similar longitudinally extending element 26 at the other ends of the wires. The belt is mounted over two pulleys 28 and 30 carried on shaft 32 which can be a driving shaft, at least one of the pulleys being designed to frictionally engage the cross wires 20 and drive the belt. Such frictional engagement is attained either by providing the pulley 30 with grooves 31 as shown in Fig. 4 or by facing both of pulleys 28 and 30 with a resilient material 34, for example, of rubber.

As shown in Figs. 3 and 4, the continuous strips are doubly slit and reversely crimped at spaced intervals to provide transverse apertures 35 through which the cross wires 20 may be inserted. The reverse crimping thus results in the strips 24 and 26 lying in the same plane as the axes of rods 20, the apertures being defined by the strip portions struck in opposite directions out of said plane. In order to aid in holding the cross wires from inadvertent release, the cross wires have relieved portions of reduced diameter at 36 leaving heads 38 at the ends of the wires which tend to engage the outer edge of the continuous element 26 whereas the inner-shoulder 40 tends to engage the inner edge of the strip 26, thus holding the wire 20 against inadvertent removal in either direction from the aperture in the strip 26. During assembly, the strip 26 may be manipulated, with or without a hand tool, to temporarily enlarge the aperture 35 to permit the passage of the head 38.

In certain cases, it may also be desirable, as shown in Fig. 6, to relieve the continuous strips 26 both on the inner edge at 41 and the outer edge at 42 adjacent the crimps, in which case the length of the relieved portion 36a (Fig. 6) is reduced so that the shoulder 40 and the head 38 are received in the relieved portions 41 and 42, respectively, thereby reducing motion between the elements and better regulating the pitch.

Fig. 8 shows a modification which is useful in the case of small cross wires and comprises merely offsetting a portion of the end of the wire 20a at 44 so that by a twisting motion it is locked into the slits in the continuous strip 26.

In Fig. 9 the holding means comprises two aligned apertures 50, 51 in the continuous strip 26b through which the offset portion of the wire 20a is inserted. Here the walls of the apertures constitute the means for holding the wires in proper parallel relation.

In Fig. 10 the continuous strip 60 is stamped out to the form shown to provide a series of diagonally extending connections 62 so that the element 60 may be bent 360° around the end of cross wire 20a taking the final form shown in Fig. 11.

In any of the above forms, opposite ends of the strips 26, 26a, 26b or 60 may be overlapped and rivetted or spot-welded together to make the endless belt.

In Figs. 12–20 the continuous elements are in the form of round wire rather than flat strips. These wires are looped around the successive cross rods 20 at the relieved portions 36b to prevent the continuous wire 70 from slipping off the ends of the rods 20. The continuous wire 70 therefore has a series of loops 72 each holding one rod 20. As shown in Fig. 13, the connecting parts of the wire 70 are thus all on one side of the series of rods 20. If desired, this structure can be supplemented by the addition on each side of the belt of a second continuous wire element 80 (Fig. 15) which is exactly like the wire 70 except that its connecting portions 82 lie on the other side of the rods 20 from the connecting portions of the element 70.

Figs. 18–20 indicate how in the construction of Fig. 12 the two opposite ends of the continuous element 70 may be utilized to join the belt into endless form. Each end of each wire 70 terminates in a hook and the hooked ends of the wires 70 are overlapped so that the hooks 90 are hooked over the ends of the same terminal rod 20 as engage the terminal loops 72 at the other end of the wire, whereas the other hooks 92 are hooked over the same terminal rod 20 as the loops 72 which are the terminal loops at the ends of the wire 70 adjacent the hooks 90.

All the embodiments can be mounted and driven as the embodiment of Fig. 1.

It can readily be seen that the objects of this invention have thus been achieved, but the number of embodiments illustrated are in no way indicative that further modifications within the scope of the invention as more broadly defined in the annexed claims are not evident to those skilled in the art.

I claim:

1. A flexible conveyor belt comprising two continuous substantially parallel elongated elements formed of flat ribbon-like non-extensible metal strips having longitudinal flexibility each element being an integral continuous piece adapted to be formed into an endless loop by looping the element and joining its abutting end portions, a series of parallel rods extending transversely between said elements, the axes of said rods lying in the same plane as the plane of said elongated elements, said rods having relieved portions of reduced diameter adjacent but spaced from their ends, a series of apertures in said elements each defined by portions of the metal strip struck in opposite directions from said plane on either side of at least one longitudinally extending slit in said strip, said rods extending through said apertures, the outer edges of said elongated elements being relieved at the struck portions, and the relieved portions of said rods being of less length than the width of said strips, the walls of said apertures engaging the relieved portion surfaces of said rods to hold said rods against inadvertent separation from said elements and the outer unrelieved portions of said rods extending into said outer edge strip relieved portions to aid in maintaining the pitch of said rods.

2. A flexible conveyor belt comprising two continuous substantially parallel elongated elements formed of flat ribbon-like non-extensible metal strips having longitudinal flexibility each element being an integral continuous piece adapted to be formed into an endless loop by looping the element and joining its abutting end portions, a series of parallel rods extending transversely between said elements, the axes of said rods lying in the same plane as the plane of said elongated elements, said rods having relieved portions of reduced diameter adjacent but spaced from their ends, a series of apertures in said elements each defined by portions of the metal strip struck in opposite directions from said plane on either side of at least one longitudinally extending slit in said strip, said rods extending through said apertures, the inner edges of said elongated elements being relieved at the struck portions, and the relieved portions of said rods being of less length than the width of said strips, the walls of said apertures engaging the relieved portion surfaces of said rods to hold said rods against inadvertent separation from said elements and the inner unrelieved portions of said rods extending into said inner edge strip relieved portions to aid in maintaining the pitch of said rods.

3. A flexible conveyor belt as claimed in claim 2 wherein the outer as well as the inner edges of said strips are relieved at said struck portions, and the unrelieved portions of said rods on either side of said strips extend into both said inner and outer edge strip relieved portions to aid in maintaining the pitch of said rods.

References Cited in the file of this patent

UNITED STATES PATENTS

| | | |
|---|---|---|
| 391,555 | Pratt | Oct. 23, 1888 |
| 777,363 | Abels | Dec. 13, 1904 |
| 1,715,197 | Grabill | May 28, 1929 |
| 1,857,726 | Lindgren | May 10, 1932 |
| 2,126,274 | Noffsinger et al. | Aug. 9, 1938 |
| 2,158,705 | Randolph | May 16, 1939 |
| 2,764,824 | King | Oct. 23, 1956 |
| 2,778,480 | Dobbins | Jan. 22, 1957 |

FOREIGN PATENTS

| | | |
|---|---|---|
| 889,275 | Germany | Sept. 10, 1953 |